(12) United States Patent
Hugger et al.

(10) Patent No.: US 11,469,514 B2
(45) Date of Patent: Oct. 11, 2022

(54) METHODS OF MANUFACTURING NANOCOMPOSITE RF LENS AND RADOME

(71) Applicant: Vadient Optics LLC, Beaverton, OR (US)

(72) Inventors: Peter G Hugger, Eugene, OR (US); Chad N Teters, Oregon City, OR (US); Ernst Adrian Henle, Eugene, OR (US); Thomas Leonard Allen, Milwaukie, OR (US); John Paul Harmon, Albany, OR (US); Samuel Peter Grimm, Philomath, OR (US); Edward Whitney Elliott, III, Eugene, OR (US); Peter Jon Polesnak, Eugene, OR (US)

(73) Assignee: VADIENT OPTICS, LLC, Beaverton, OR (US)

( * ) Notice: Subject to any disclaimer, the term of this patent is extended or adjusted under 35 U.S.C. 154(b) by 0 days.

(21) Appl. No.: 16/439,493

(22) Filed: Jun. 12, 2019

(65) Prior Publication Data

US 2022/0140492 A1    May 5, 2022

(51) Int. Cl.
| | | |
|---|---|---|
| *H01Q 15/02* | (2006.01) | |
| *B33Y 70/10* | (2020.01) | |
| *B33Y 80/00* | (2015.01) | |
| *B33Y 10/00* | (2015.01) | |

(52) U.S. Cl.
CPC .............. *H01Q 15/02* (2013.01); *B33Y 70/10* (2020.01); *B33Y 80/00* (2014.12); *B33Y 10/00* (2014.12)

(58) Field of Classification Search
CPC ........ H01Q 15/02; B33Y 70/10; B33Y 80/00; B33Y 10/00
See application file for complete search history.

(56) References Cited

U.S. PATENT DOCUMENTS

| | | | |
|---|---|---|---|
| 10,596,754 B2 * | 3/2020 | Williams | B29C 64/106 |
| 2014/0292615 A1 * | 10/2014 | Liu | H01Q 19/062 |
| | | | 343/912 |
| 2017/0268133 A1 * | 9/2017 | Graley | D01F 1/10 |
| 2019/0127595 A1 | 5/2019 | Williams | |

OTHER PUBLICATIONS

Chartoff, R. et al., "Functionally Graded Polymer Matrix Nano-Composites by Solid Freeform Fabrication: A Preliminary Report," Proceedings of Solid Freeform Fabrication Symposium, Aug. 4, 2003, Austin, Texas, 7 pages.
Choy, T., "Effective Medium Theory: Principles and Applications, Second Edition," Oxford University Press, 2016, 7 pages. (Title and Table of Contents Submitted.).
Cohen, M. et al., "Effective Medium Theory for the Hall Effect in Disordered Materials," Physical Review Letters, vol. 30, No. 15, Apr. 9, 1973, 3 pages.

(Continued)

*Primary Examiner* — Rick K Chang
(74) *Attorney, Agent, or Firm* — Alleman Hall Creasman & Tuttle LLP (57) ABSTRACT

A method of additively manufacturing a composite article with tuned impedance and refractive-index in three dimensions. The method includes providing a ferrite feedstock. The ferrite feedstock is loaded with ferrite particles. The method further includes depositing and curing the ferrite feedstock. Therein a composite article is formed.

21 Claims, 6 Drawing Sheets

(56) References Cited

OTHER PUBLICATIONS

McMorrow, B. et al., "Polymer Matrix Nanocomposites by Inkjet Printing," Proceedings of Solid Freeform Fabrication Symposium, Aug. 1, 2005, Austin, Texas, 10 pages.
Sihvola, A., "Metamaterials in electromagnetics," Metamaterials, vol. 1, No. 1, Mar. 2007, 10 pages.
Singh, H. et al., "Low Profile Conformal Antenna Arrays on High Impedance Substrate," SpringerBriefs in Electrical and Computer Engineering, 2016, 6 pages. (Title and Table of Contents Submitted.).
Xie, Y. et al., "Microwave metamaterials made by fused deposition 3D printing of a highly conductive copper-based filament," Applied Physics Letters, vol. 110, No. 18, May 1, 2017, 5 pages.

\* cited by examiner

METHODS OF MANUFACTURING NANOCOMPOSITE RF LENS AND RADOME

STATEMENT OF GOVERNMENT INTEREST

This invention was made with government support under contract no. N00178-17-00021 awarded by the Navy. The government has certain rights in the invention.

REFERENCE TO RELATED APPLICATIONS

Not applicable

TECHNICAL FIELD OF THE INVENTION

The present invention relates in general to low frequency to radio frequency devices. The application relates in particular to methods of manufacturing impedance-tuned devices using nanocomposites and additive manufacturing techniques.

DISCUSSION OF BACKGROUND

This application relates to devices for use in low frequency and up to radio frequency. One example, a radome, is a structure that protects a radar antenna. Preferably it is constructed from a material that is robust, but also minimally attenuate the electromagnetic radiation that the antenna is supposed to transmit or receive. Maritime, fixed array, airborne array, civilian and defensive bandpass reservations lie throughout the RF communications wavelengths between 1 MHz-9 GHz (approximately MF band through X band). Upcoming cell-phone data networks such as "fifth generation" or 5G networks, as well as already-established data network protocols use frequencies from 600 MHz up to 60 GHz.

Radome design typically uses films to try to decrease attenuation. The current disclosure provides another approach.

SUMMARY OF THE INVENTION

Disclosed hereinbelow are methods and composite articles for use in the low frequency and up to the radio frequency range. One method provides for additively manufacturing a composite article with tuned impedance and refractive-index in three dimensions. The method includes providing a ferrite feedstock The ferrite feedstock is loaded with ferrite particles. The method further includes depositing and curing the ferrite feedstock. The method can also include depositing a structural feed with greater mechanical strength than the ferrite feedstock.

BRIEF DESCRIPTION OF THE DRAWINGS

The accompanying drawings, which are incorporated in and constitute a part of the specification, illustrate preferred methods and embodiments of the present invention. The drawings together with the general description given above and the detailed description of preferred methods and embodiments given below, serve to explain principles of the present invention.

DETAILED DESCRIPTION OF THE INVENTION

Referring now to the drawings, wherein like components are designated by like reference numerals. Methods and embodiments of the present invention are described further hereinbelow.

In accordance with the present disclosure methods and articles for methods and composite articles for use in the low frequency and up to the radio frequency range are disclosed. The methods herein provide for additively manufacturing a composite article with tuned impedance and refractive-index in three dimensions. The resulting composite article can have tuned impedance for use in a variety of frequencies including ELF and radio waves. The composite article can be designed and built for transmission or reflective purposes. Transmissive devices include a radome or other antenna covering, radio-frequency lens, polarizer, or diffractive structure such as a radio-frequency grating. Additively manufacturing the article provides for 3-dimensional spatial control of the impedance and refractive-index within the composite article as well as overall shape.

One method includes providing and depositing a ferrite and polymer feedstock with additive manufacturing system. The ferrite and polymer feedstock is loaded with ferrite ceramic particles. The polymer and ferrite feedstock can be further supported with a structural feed material with greater mechanical strength than the ferrite feedstock. The additive manufacturing system is used to deposit and/or cure the ferrite feedstock and the structural feedstock. The structural feedstock is deposited or otherwise processed to form an ordered matrix. The ordered matrix has openings or gaps wherein the ferrite feedstock is deposited. The feedstock is cured, if necessary. Therein a composite article is formed with tuned impedance matching and refractive index in three dimensions.

Additive manufacturing (AM) systems compatible with the current disclosure include inkjet print (IJP), fused deposition modeling (FDM), selective laser sintering (SLS), multi-het fusion (MJF), multi jet printing (MJP), stereo lithography (SL), direct metal laser sintering (DMLS), selective laser melting (SLM), multiphoton photopolymerization (MPPP), powder jet deposition (PJD) or combinations thereof.

The feedstock formulation is based on the additive manufacturing equipment. Regardless of the additive manufacturing the ferrite feedstock needs ferrite nanoparticles loaded into a compatible medium for the desired additive manufacturing equipment. Loading ferrite nanoparticles into a medium typically results in a lowered structural strength. For instance, loading nanoparticle ferrite ceramics into a medium such as polyamide-6, polyamide-12, TCMDA, polylactic acid, polystyrene, polyurethane, etc. at volumes higher than 5% results in a composite that is brittle and has a tendency to crumble or crack. These properties result in a material that is not conducive for casting or molding.

The ferrite and polymer feedstock can be loaded with ferrite materials to at least 1%, 10%, or 30% by volume. The ferrite feedstock is chosen from spinel ferrite, hexaferrite, garnet, perovskite and ceramic material classes, or polymer air mixtures thereof. In some embodiments the ferrite is a particle of nanometer size. The ferrite nanoparticles can be treated to have surface functionality. Surface functionality can be accomplished during synthesis using fatty acids or amphiphilic polymer wrapping with polymaleic anhydride and polyacrylamide (PAM). Further ligand modification using surface-bound bifunctional silanes or phosphonates with chain and terminal groups including, acrylate, vicinal diol, amide, amine, polyethylene glycol and carboxylic functionality is chosen with appropriate chemistry for the additive manufacturing equipment and polymer system used.

When necessary, the current disclosure overcomes structural drawbacks by providing a structural feedstock with higher mechanical strength. The structural feedstock can be any material that has higher mechanical strength than the ferrite feedstock. The structural feedstock can be the pure form of the same medium used in the ferrite feedstock. The structural feedstock is deposited in an ordered matrix to provide mechanical strength to the resulting composite article. The structural material may be an organic material, for example nylon or acrylic. The structural feed stock can be arranged as an ordered matrix, have a crystallographic like lattice, a plurality of unit cells, or a combination thereof. The gaps within the ordered matrix are filled with the ferrite feedstock.

In a typical process, during AM, the composite article is built in layers. For instance, a layer of the structural feedstock formed. Then a 2D layer, in which the regions are defined, may be printed using the structural feedstock. Either after or simultaneously the ferrite feedstock is deposited in regions (gaps or voids) that do not contain the structural feedstock or material. This process continues, layer-by-layer. As the height of the assembly reaches the dimension of a unit cell, the structural feedstock can be printed to encapsulate the ferrite feedstock or material. In this way, the ferrite feedstock material is supported by the mechanically robust structural feedstock material.

Thermal stresses related to the difference in CTE between the highly loaded composite in the unit cell (with a low CTE) and the mechanically robust feedstock material in the walls (with a relatively higher CTE) are minimized by choosing material selection for closely matched CTE. Alternatively, the unit cell size can be minimized to reduce the geometric distance over which the CTE mismatch takes place. Also, non-periodic, random, or fractal unit cells and cellular lattice structures may be used to break up the mismatched displacement caused by thermal expansion or contraction. Moreover, unit cell edges may be rounded or chamfered to reduce thermal and physical stress concentrations and improve mechanical robustness.

Similarly, related to preferential fracturing or fatigue can be addressed using similar methods. The optimal structures can be designed using FEA methods.

Regarding design for any particular application, the impedance of the composite article can be manipulated by uses the size-, shape- and compositional-properties of nanoparticles loaded into the ferrite feedstock a particular volume fractions (vol. %) of between 0 vol. % and 50 vol. % within a suitable AM medium to tune the frequency dependent refractive index and frequency dependent wave impedance of the resulting nanocomposite. In some examples, geometrical elements of the resulting structure are kept to a size approximately $\lambda/10$ or smaller, the resulting structure can be viewed as an effective medium in which the bulk properties of the composite are viewed as an average of materials properties such as the permittivity $\varepsilon(f)=\varepsilon(f)^*=\varepsilon(f)'-j\varepsilon(f)''$ and permeability $\mu(f)=\mu(f)^*=-j\mu(f)''$. For such an effective medium, transmission line theory can be used to design a radome or other antenna element with known reflection, transmission, absorptive, refractive, and phase delay properties. For any given wavelength/frequency of radiation, the reflectivity, for example, is written as:

$$R = \frac{Z_{in} - Z_0}{Z_{in} + Z_0}$$

Where $Z_0$ is the impedance of free space (377Ω) or the impedance of the operational environment and $Z_{in}$ is given by the single-layer expression:

$$Z_{in} = Z_c \frac{Z_L + Z_c \tanh\left(\frac{j\beta d + \alpha d}{c}\right)}{Z_c + Z_L \tanh\left(\frac{j\beta d + \alpha d}{c}\right)}$$

Where $Z_c$ is the effective medium impedance:

$$Z_c = Z_0 \sqrt{\frac{\mu}{\varepsilon}}$$

and $Z_L$ is the impedance of the backing layer. In the case in which the backing material to this composite structure is metal, $Z_L=0$ and the expression simplifies to:

$$Z_{in} = Z_c \tanh\left(\frac{j\beta d + \alpha d}{c}\right)$$

These relations for the permittivity and permeability are complex valued such that the parameters $\beta$ and $\alpha$ are given by $j\omega\sqrt{\mu\varepsilon}=\alpha+j\beta$ where j is the complex number: $j=\sqrt{-1}$.

Figure 1A:
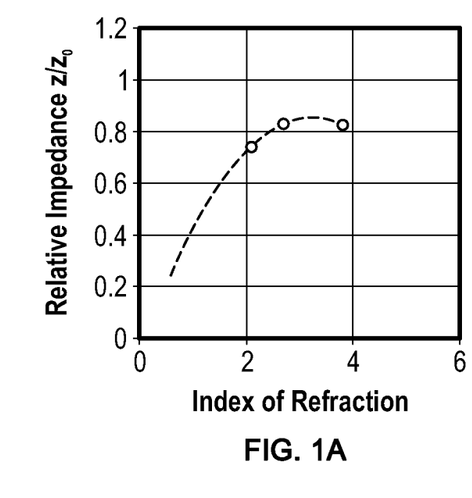
FIG. 1A, FIG. 1B, and FIG. 1C are graphs providing the relation between wave impedance and the refractive index of ferrite and polymer feedstock.
Figure 1B:
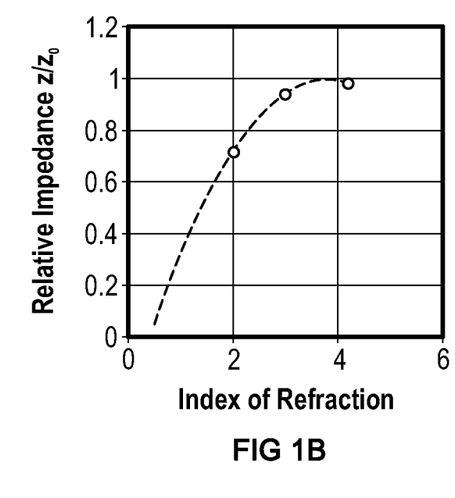
Figure 1C:
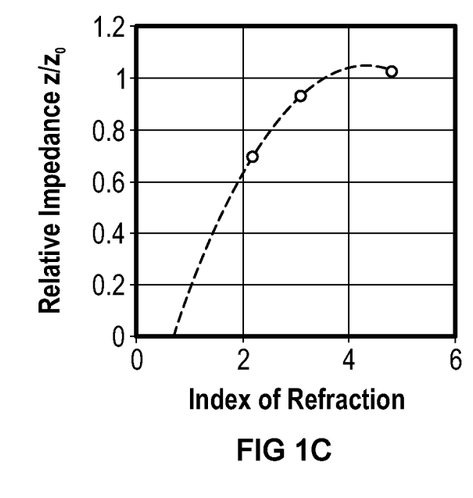

Referring to FIGS. 1A, 1B, and 1C, the relation between wave impedance and the refractive index of ferrite feedstock loaded with spinel-ferrite nanoparticles is shown at different frequency bands. FIG. 1A. Each of the figures provides for a different band. FIG. 1A provides UHF/VHF, FIG. 1B provides HF, and FIG. 1C provides MF. The data points represent loading ferrite loading by volume from 13% to 50%.

This material is also useful for shortening the wavelength of radiation within the composite ($\lambda$) with respect to the free-space wavelength (Xo) by a factor equivalent to its refractive index (n):

$$\frac{\lambda_0}{\lambda} = n.$$

This allows for engineered waveguides, patterned ground planes, antenna coatings and patterned treatments and similar applications in which the patterned composite is intended to affect radiative or transmissive modes, cavity resonances and other self-interference effects. One example of such an application would be the filling of a rectilinear waveguide with composite material of μ(f)>1 in which the lowest frequency propagating mode is shifted to lower frequency by use of the composite:

$$f_{mn} = \frac{1}{2\pi\sqrt{\mu\varepsilon}}\sqrt{\left(\frac{m\pi}{a}\right)^2 + \left(\frac{n\pi}{b}\right)^2}$$

Where m and n are the mode indices; a and b refer to the rectilinear waveguide dimensions.

The ferrite nanoparticles can be produced such that the particle size is equivalent to approximately one magnetic domain size (typically 20- to 100 nm diameter for spinel ferrites), which allows for maximum incorporation of high real permeability phase while minimizing magnetic loss. The particles are then functionalized with ligands on the surface to allow solubility in the additive manufacturing (AM) feedstock.

Figure 2:
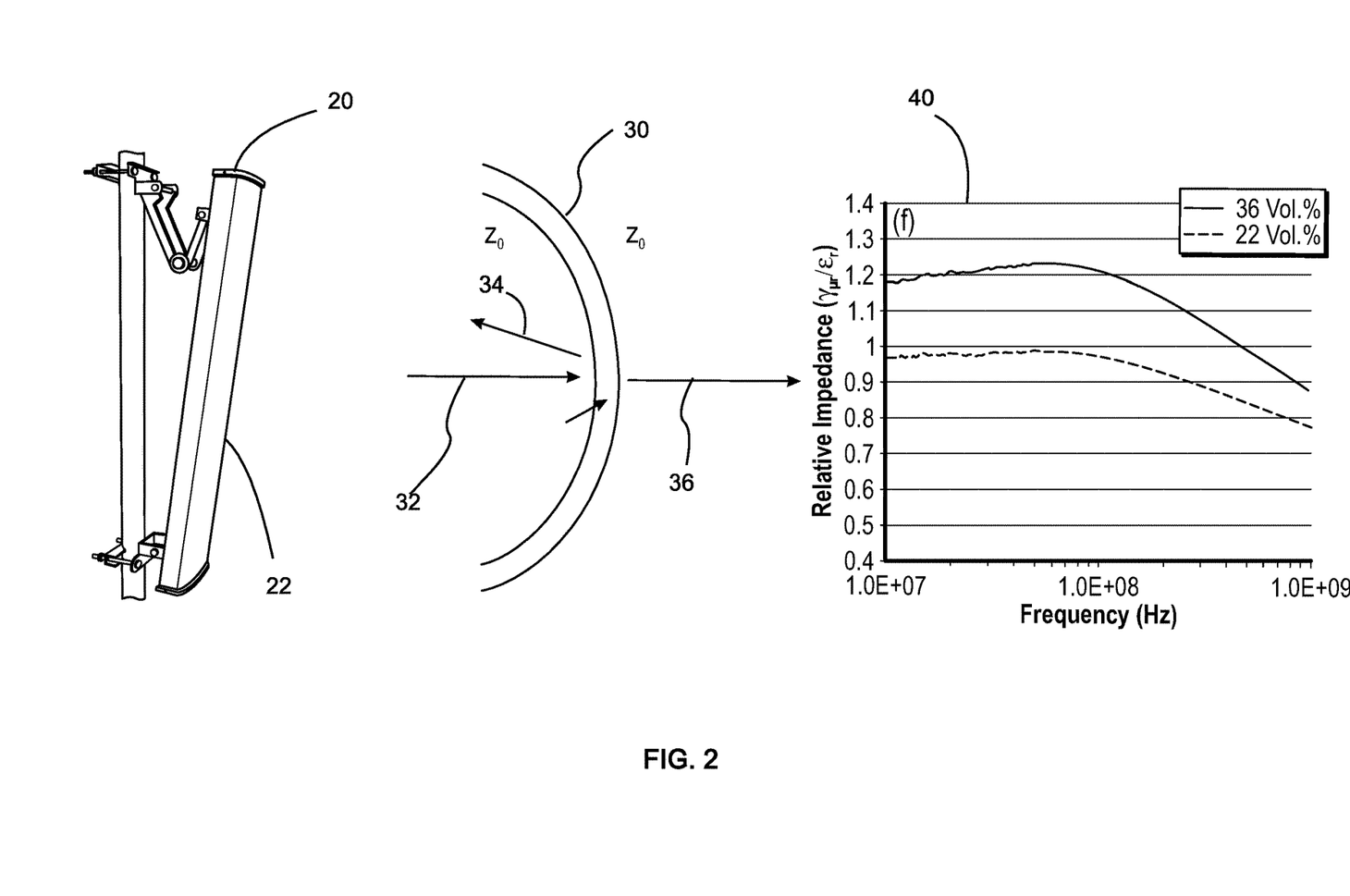
FIG. 2 is a perspective view of a prototypical composite article manufactured from a polymer and ferrite feedstock.

Referring to FIG. 2, a prototypical radome design is provided. An antenna 20 has a radome body 22 made from the methods of the present disclosure. Radome body 22 has radome shielding model 30 with a variable thickness and is constituted of material with a variable characteristic impedance, $Z_c$, and variable local refractive index, n(x,y,z) resulting in local extrinsic impedance of Z(x,y,z,t). In this design the radome body is surrounded by air, which has wave impedance $Z_0$=377Ω. A signal 32 generated by the underlying antenna 20 impinges on the radome body 22, here shown in the radome shielding model 30. A reflection 34 occurs with coefficient $$R = \frac{Z_{in} - Z_0}{Z_{in} + Z_0}$$

where $Z_{in}$ is the impedance seen by a wave impinging as shown. Input impedance is a function of composite effective wave impedance and geometrical properties. Absorption occurs within the radome material with coefficient A and is a function of the dielectric loss tangent $$\left(\tan\delta_d = \frac{\varepsilon''}{\varepsilon'}\right)$$

and the magnetic loss tangent $$\left(\tan\delta_m = \frac{\mu''}{\mu'}\right).$$

A transmitted radiation 36 is transmitted with coefficient T=1−R−A. A graph 40 provides data showing that for a single 1:1 ratio of Ni:Zn within the spinel ferrite nanoparticle system, wave impedance can be tuned from below free space impedance (Relative Impedance=1) to above free space impedance by adjusting the volume loading fraction. Here a nanoparticle loading of 22 and 36 percent are shown.

Figure 3A:
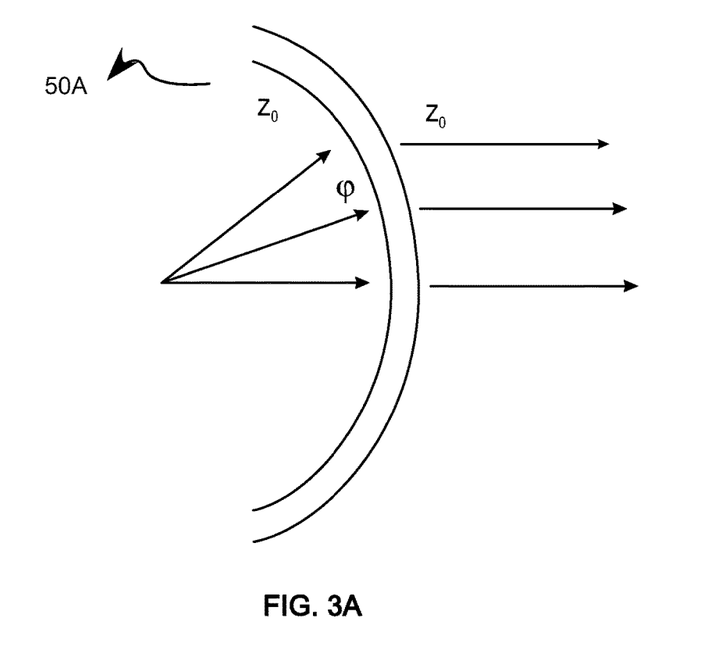
FIG. 3A is a graphical illustration of a collimating radome design.
Figure 3B:
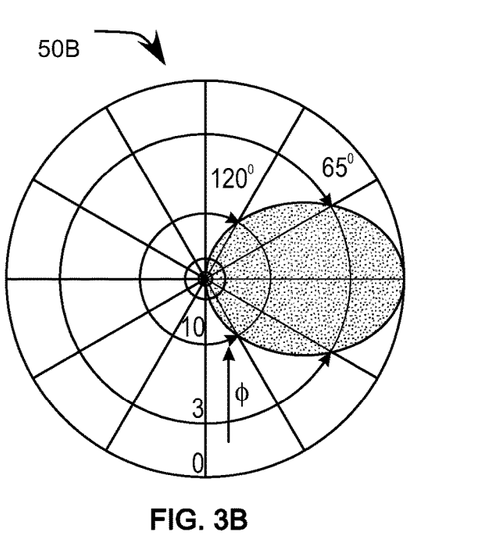
FIGS. 3B and 3C are polar plots of radome designs of the composite article.
Figure 3C:
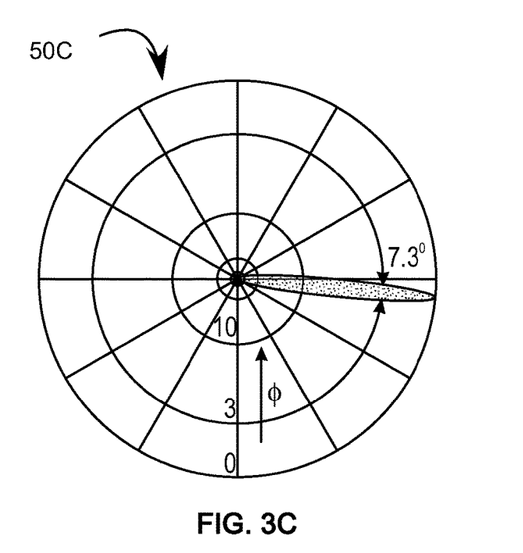

Referring to FIGS. 3A, 3B, and 3C, FIG. 3A provides a model representation of a collimating radome design and FIG. 3B and FIG. 3C provide polar plots of a radio lobs design in accordance with the present disclosure. A composite article 50A has impedance and geometry such that it acts as a collimating lens or antenna. As aforementioned, using additive manufacturing allows for various geometries including curvature. FIG. 50B provides a polar plot of an antenna radome design to allow a wide lobe with an angle of about 65 degrees. FIG. 50C is similar to that shown n FIG. 3C except here the lob angle is reduced at about 7.3 degrees.

Figure 4A:
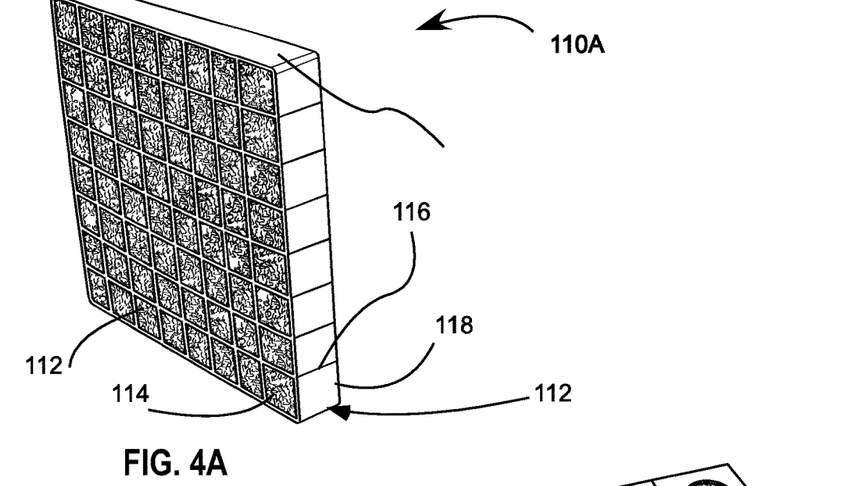
FIG. 4A is a perspective view of a composite article manufactured using additive manufacturing equipment comprising of depositing a ferrite feedstock and structural feedstock.
Figure 4B:
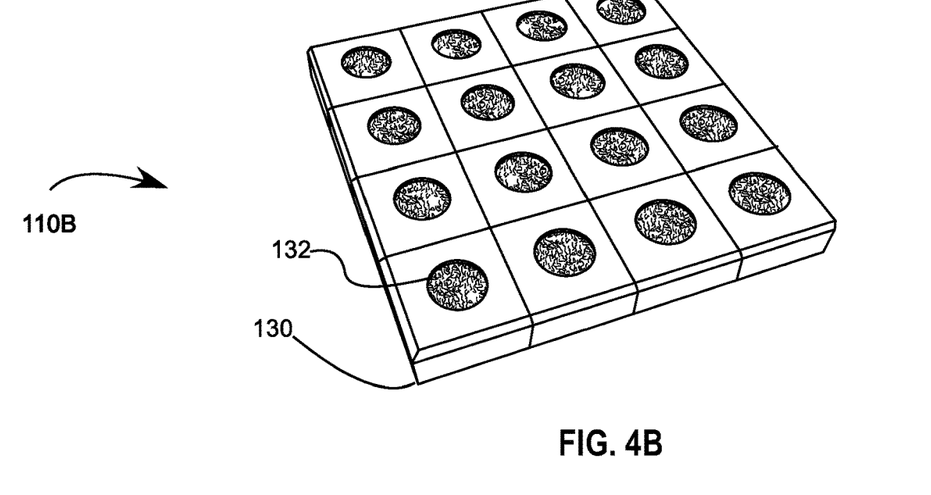
FIG. 4B is a perspective view of another composite article manufactured in accordance with the present disclosure's methods of manufacture.
Figure 4C:
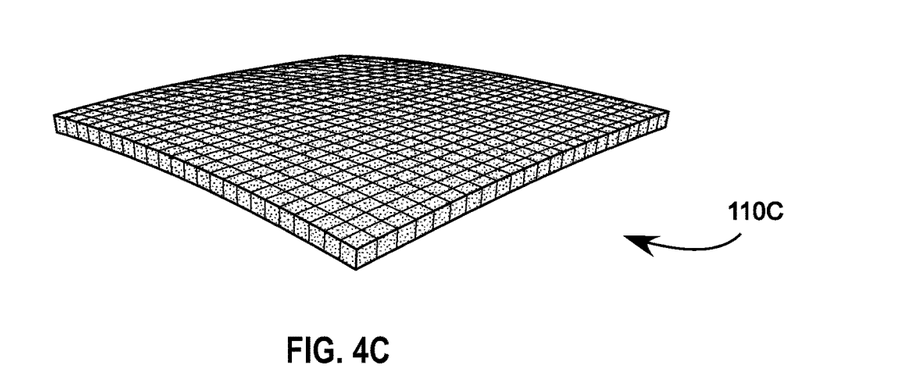
FIG. 4C is a perspective view of yet another composite article wherein the composite article is curved.

Referring to FIG. 4A, FIG. 4B, and FIG. 4C, a composite article 100A, 100B, and 100C are shown in perspective view. FIG. 4A shows nanocomposite 100A. Here a dielectric organized matrix is patterned with an 8 by 8 grid of cubes. An exemplary unit cell 112 is in a corner with a sidewall 114 and a sidewall 116 made from a structural feedstock material. In addition, the cube 112 has sidewall 118 and another sidewall (not shown in view) and a top and bottom that encapsulates a ferrite nanocomposite 120. In these examples, the square gaps or voids in the ordered matrix allows for maximum fill of the ferrite nanocomposite feedstock.

FIG. 4B shows a perspective view or a nanocomposite grid 110B. Here, an ordered matrix is patterned as a 4 by 4 grid. An exemplary unit cell 1 30 is similar to that shown in FIG. 4A, except here the cube has a cylindrical volume 132 of the ferrite feedstock. In this example the cylindrical volumes are the same shape and size. There are many variants to the basic concept. For example, non-homogeneous structural feedstock can be used to create unit cells. The voxels may include fillers containing different material types embedded in one or more host materials. The properties of the voxels may be non-uniform within a unit cell. For example, the voxel materials may be deposited in gradients and other compositional geometries.

The unit cells can also differ from one another. Unit cells may be one or more volumetric shape, and each may have different voxel compositions. One or more unit cells can be arranged in cellular lattice structures, or varying type. The material may also be either an organic, metal, or nanocomposite material. The materials can be cured as they are deposited using optical radiation, including laser radiation, and can be cured using thermal ovens or lamps.

If desired, it is also possible to interconnect one or more of the unit cells, so they form an interconnected region within the composite article. For example, this may be advantageous for achieving thermal and electrical conductivity across the article or to aid in a liquid-phase filling of the composite mixture into the structural frame. In addition, the unit cells can be sized sufficiently small with spacing and volumes changing to create a desired effect as is described in more detail hereinbelow.

FIG. 4C shows a perspective view of a composite article 110C. Composite article 110C is a square guide similar to that shown in FIG. 1A, but here a freeform curvature This embodiment provides one example of the degrees of freedom provided by the presents disclosures additively manufactured methods.

Figure 5A:
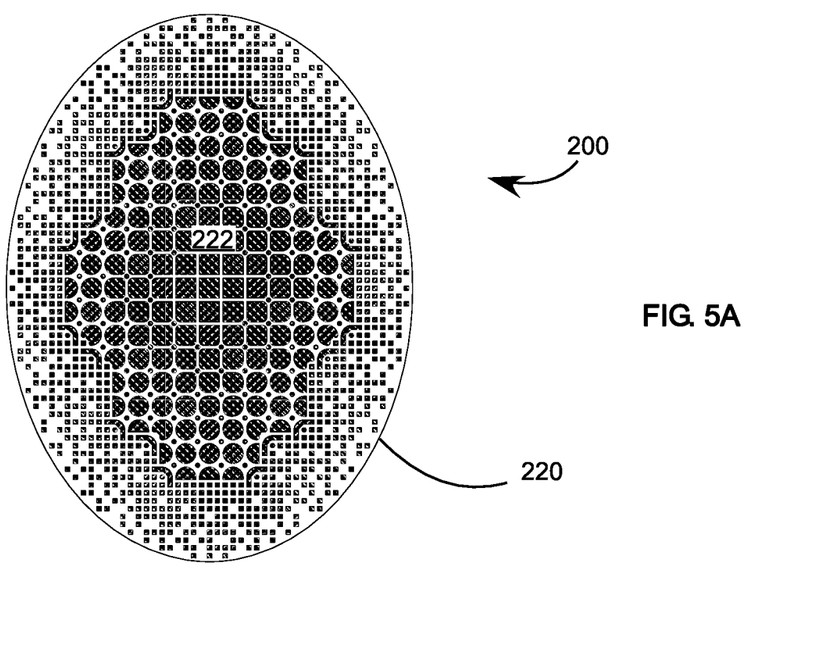
FIG. 5A is a plan view of a composite article of an RF focusing lens with structures less than $\frac{1}{10}$ of the wavelength of radio frequency of intended use.
Figure 5B:
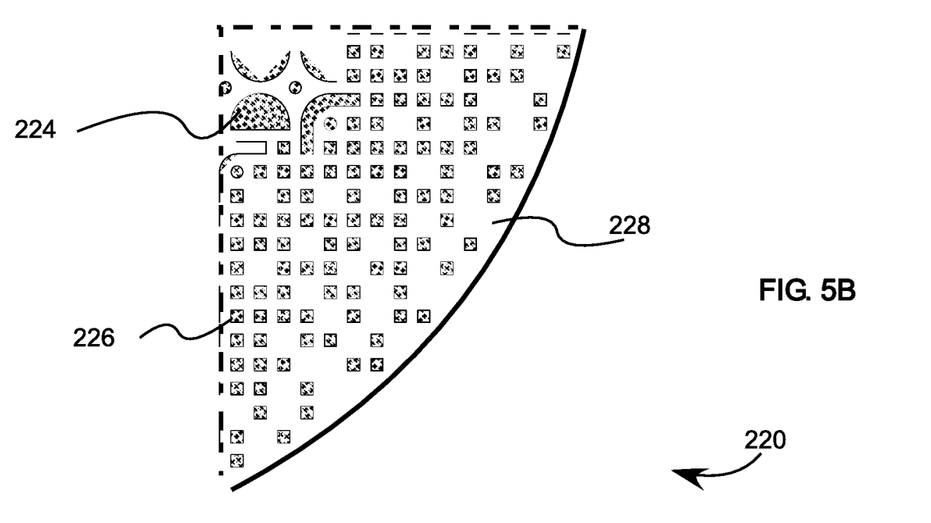
FIG. 5B is a partial view detailing that shown in FIG. 5A.

Referring to FIGS. 5A and 5B, a plan view of a composite article 200 is shown. FIG. 5B is a zoom in view of a corner piece 202 providing increased detail. Composite article 200 has a number of voids or unit cells filled with ferrite feedstock. Composite article 200 is an RF focusing lens. Here, the unit cells are sized less than λ/10 the radio frequency of intended use. As aforementioned, when the structures are kept to a size approximately λ/10 or smaller, then the resulting local area can be viewed from a bulk property perspective. Here, in the center of composite article 200 is a plurality of square cells 222. The square structure provides an increased fill factor and therefore increased local impedance. The density and shape of the cells change radially from the center. As shown in the zoom view a half circle 224 transitions into smaller square cells, such as cell 226. Density of the cells is least at a perimeter 228. The decreasing fill factor, smaller size cells and increased spacing create a decreasing impedance from the radius and therefore acts as a lens in the spectrum from 30 Hz to 80 GHz domain resulting in a focusing lens.

Referring now to FIGS. 6A, 6B, 6C, 6D, and 6E, a number of cross-section views of composite article geometries are shown. A monolithic composite article 600A comprises a homogenous dielectric material A. Herein, "homogenous dielectric" means that the dielectric properties are constant with respect to the frequencies of intended use, not that the material is homogenous physically. For instance, composite article 600A can comprise voids, unit cells, or other such structures with a size sufficiently small that the frequencies of intended use interact with the average optical properties of the medium.

Figure 6A:
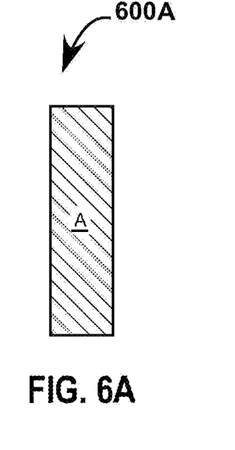
FIG. 6A provides a model view of a homogenous composite article.
Figure 6B:
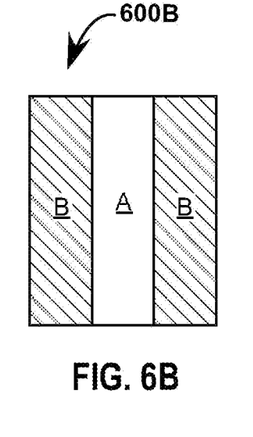
FIGS. 6B, 6C, 6D, and 6E provide cross-section views of various sandwich radome designs.
Figure 6C:
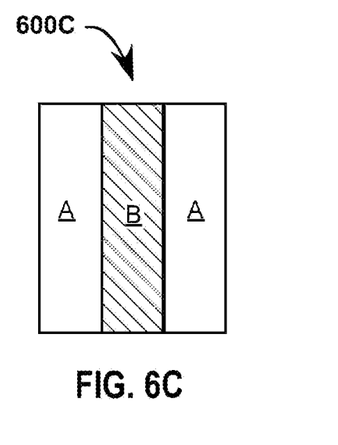

A composite article 600B and 600C have an A-sandwich geometry and B-sandwich geometry, respectively. Composite article 600B has a homogenous dielectric material A sandwiched by homogenous dielectric material B. Dielectric material A has lower dielectric properties (i.e. lower dielectric constant or permittivity) than dielectric material B. Composite article 600C has a homogenous dielectric material B sandwiched by homogenous dielectric material A.

Figure 6D:
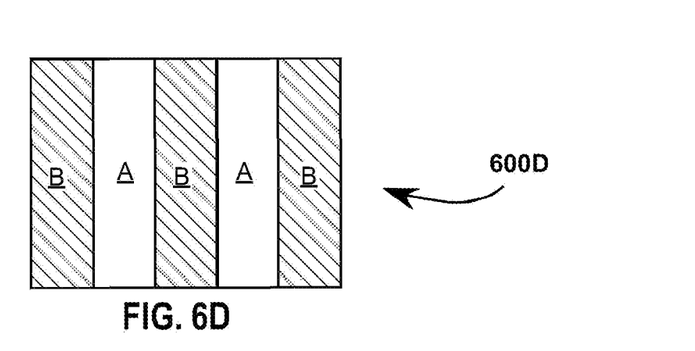
Figure 6E:
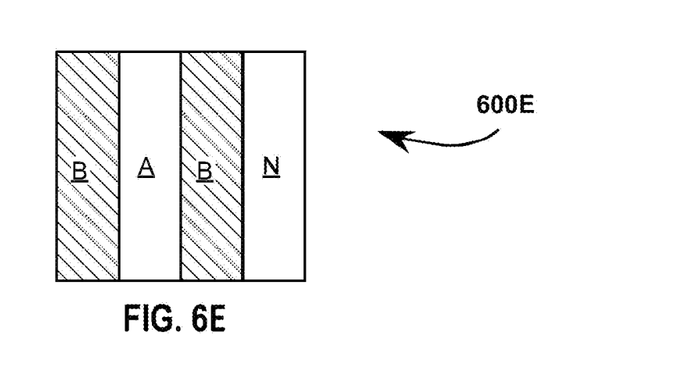

Composite articles 600D and 600E have C-sandwich geometry and N-layer laminate geometry, respectively. Composite article 600D has homogenous material B sandwiched with homogenous material A, further sandwiched with homogenous material B. Composite article 600E is a generalized geometry shown here with an A-sandwich geometry similar to that shown in FIG. 6B, further including an p-layer N. N-layer N may have any frequency dependent transmission properties as needed.

From the description of the present invention provided herein one skilled in the art can implement the method of manufacture in accordance with the present invention. While the present invention has been described in terms of particular examples, others can be implemented without departing from the invention. In summary, the present invention is described above in terms of particular embodiments. The invention, however, is not limited to the embodiments described and depicted herein. Rather, the invention is limited only by the claims appended hereto.

What is claimed is:

1. A method for manufacturing a composite article, the method comprising:
   providing a ferrite-and-polymer feedstock loaded with ferrite ceramics;
   depositing the ferrite-and-polymer feedstock, thereby forming the composite article, with tuned impedance and refractive index in three dimensions.

2. The method of claim 1, wherein the ferrite-and-polymer feedstock includes one or more of polyamide-6, polyamide-12, epoxy, tricyclodecane dimethanol dimethacrylate (TCMDA), polylactic acid, polystyrene, polyurethane, and wherein the ferrite ceramics include ferrite nanoparticles.

3. The method of claim 2, wherein the ferrite nanoparticles comprise at least 1 volume percent and up to 50 volume percent of the ferrite-and-polymer feedstock.

4. The method of claim 2, wherein the ferrite nanoparticles are sized to achieve a single magnetic domain.

5. The method of claim 1 wherein the ferrite ceramics include one or more of spinel ferrite, hexaferrite, garnet, and perovskite ceramic material classes.

6. The method of claim 2 wherein the ferrite nanoparticles have surface ligand functionality.

7. The method of claim 1, further comprising depositing a structural material.

8. The method of claim 7 wherein the structural material comprises a thermoplastic or UV-curable polymers.

9. The method of claim 1, further comprising providing and depositing a non-loaded feedstock, the non-loaded feedstock being chemically compatible with the ferrite-and-polymer feedstock, wherein depositing the non-loaded and ferrite-and-polymer feedstocks define a local concentration change of ferrite loading thereby forming a gradient variation of the ferrite loading in the three dimensions.

10. The method of claim 9, wherein the local concentration change is greater than 1%.

11. The method of claim 9 wherein the non-loaded feedstock is deposited as a patterned matrix.

12. The method of claim 11, wherein the patterned matrix has gaps that vary in size thereby increasing or decreasing the impedance.

13. The method of claim 12 wherein the composite article is configured to receive electromagnetic radiation of a wavelength, and wherein the gaps are less than one-tenth of the wavelength.

14. The method of claim 1, wherein the composite article is a radio-frequency lens.

15. The method of claim 1, wherein the composite article is one or more of a radome with impedance matched to surrounding free space, a waveguide, waveguide-based transmission or receiving structure, or an antenna.

16. The method of claim 1, wherein the composite article is a curved article.

17. The method of claim 1, wherein depositing the ferrite-and-polymer feedstock comprises depositing via additive manufacturing, including one or more of including inkjet printing (IJP), fused deposition modeling (FDM), selective laser sintering (SLS), multi-jet fusion (MJF), multi jet printing (MJP), stereo lithography (SL), direct metal laser sintering (DMLS), selective laser melting (SLM), multiphoton photopolymerization (MPPP), and powder jet deposition (PJD).

18. The method of claim 1, wherein the composite article comprises an A sandwich, B sandwich, C sandwich, or hybrid sandwich.

19. The composite article of claim 1, wherein the medium is free space.

20. The method of claim 7 wherein the structural material includes one or more of polyamide-12, polyamide-6, polystyrene, polyurethane, polyethylene, acrylonitrile butadiene styrene, polypropylene, tricyclodecanedimethanol diacrylate, neopentyl glycol diacrylate, diethyleneglycol diacrylate, 1,6-hexanediol diacrylate, polycarbonate, and polyetherimide.

21. A composite article comprising:
   a cured ferrite and polymer feedstock loaded with ferrite ceramics, wherein a distribution of the ferrite ceramics imparts to the composite article a tuned impedance and refractive index in three dimensions with respect to a medium.

* * * * *